(12) United States Patent
Hargreaves et al.

(10) Patent No.: US 7,828,489 B1
(45) Date of Patent: Nov. 9, 2010

(54) KEYBOARD WITH A PAIR OF PIVOTABLE KEYING MODULES

(75) Inventors: William R. Hargreaves, Bellevue, WA (US); Carsten Buus, Snohomish, WA (US); Jonathan H. Biggs, Lake Forest Park, WA (US)

(73) Assignee: Kinesis Corporation, Bothell, WA (US)

( * ) Notice: Subject to any disclaimer, the term of this patent is extended or adjusted under 35 U.S.C. 154(b) by 1222 days.

(21) Appl. No.: 11/342,286

(22) Filed: Jan. 27, 2006

Related U.S. Application Data

(60) Provisional application No. 60/647,546, filed on Jan. 27, 2005.

(51) Int. Cl.
*G06F 3/023* (2006.01)

(52) U.S. Cl. .................................. 400/489; 400/472

(58) Field of Classification Search ................ None
See application file for complete search history.

(56) References Cited

U.S. PATENT DOCUMENTS

| | | | | |
|---|---|---|---|---|
| 1,395,049 A | 10/1921 | McNamara | ................ | 400/482 |
| 1,652,464 A | 12/1927 | Tyberg | ................ | 400/489 |
| 2,040,248 A | 5/1936 | Dvorak et al. | | |
| 2,192,594 A | 3/1940 | Brand et al. | ................ | 197/11 |
| 3,929,216 A | 12/1975 | Einbinder | ................ | 197/100 |
| 3,945,482 A | 3/1976 | Einbinder | ................ | 197/100 |
| 3,990,565 A | 11/1976 | Felton et al. | ................ | 197/98 |
| 4,244,659 A | 1/1981 | Malt | | |
| 4,378,553 A | 3/1983 | McCall | ................ | 340/365 |
| 4,509,873 A | 4/1985 | Ryan | ................ | 400/489 |
| 4,597,681 A | 7/1986 | Hodges | ................ | 400/488 |
| 4,661,005 A | 4/1987 | Lahr | ................ | 400/489 |
| 4,897,649 A | 1/1990 | Stucki | ................ | 341/22 |
| 5,067,834 A | 11/1991 | Szmanda et al. | ................ | 400/489 |
| 5,073,050 A | 12/1991 | Andrews | | |
| 5,122,786 A | 6/1992 | Rader | ................ | 340/711 |
| 5,137,384 A | 8/1992 | Spencer et al. | ................ | 400/489 |
| 5,228,791 A | 7/1993 | Fort | | |
| 5,311,210 A | 5/1994 | O'Brien et al. | | |
| 5,322,967 A | 6/1994 | Matsuda | | |

(Continued)

FOREIGN PATENT DOCUMENTS

JP        07160386 A    *    6/1995

(Continued)

OTHER PUBLICATIONS

Nakaseko et al., "Studies on Ergonomically Designed Alphanumeric Keyboards," *Human Factors*, 1985, pp. 175-187.

(Continued)

*Primary Examiner*—Daniel J Colilla
(74) *Attorney, Agent, or Firm*—Seed IP Law Group PLLC

(57) ABSTRACT

A computer keyboard incorporates a base member, a keying module and a spacing member coupled therebetween. The spacing member is pivotable over a range of angles to allow the keying module to be retained at a range of discrete, desired angles above a support structure such as a desktop. An embodiment incorporates two such assemblies linked together by a sliding member, further allowing the keying modules to be spaced apart laterally from each other by a desired distance. Another embodiment incorporates a hinged linking member, allowing the keying modules to also be angled with respect to each other about an axis normal to the support plane.

12 Claims, 12 Drawing Sheets

U.S. PATENT DOCUMENTS

| | | |
|---|---|---|
| 5,334,997 A | 8/1994 | Scallon |
| 5,351,066 A | 9/1994 | Rucker et al. ............... 345/168 |
| 5,375,800 A * | 12/1994 | Wilcox et al. ............ 248/118.1 |
| 5,388,921 A * | 2/1995 | Chung ........................ 400/472 |
| 5,424,728 A | 6/1995 | Goldstein .................... 341/22 |
| 5,454,652 A | 10/1995 | Huellemeier et al. ........ 400/489 |
| 5,457,452 A | 10/1995 | Skovronski .................. 341/22 |
| 5,466,078 A | 11/1995 | Szmanda et al. |
| 5,490,039 A | 2/1996 | Helms |
| 5,574,481 A * | 11/1996 | Lee ............................. 345/168 |
| 5,596,480 A | 1/1997 | Manser et al. .............. 361/680 |
| 5,612,718 A | 3/1997 | Bryan |
| 5,646,817 A | 7/1997 | Manser et al. .............. 361/680 |
| 5,653,543 A | 8/1997 | Abe ........................... 400/489 |
| 5,732,928 A * | 3/1998 | Chang ........................ 248/688 |
| 5,754,395 A | 5/1998 | Hsu et al. ................... 361/680 |
| 5,769,551 A | 6/1998 | Tsai et al. ................... 400/489 |
| 5,826,839 A * | 10/1998 | Chen .......................... 248/118 |
| 5,841,635 A | 11/1998 | Sadler et al. ................ 361/749 |
| 5,904,327 A * | 5/1999 | Cheng ..................... 248/118.1 |
| 5,909,864 A | 6/1999 | Wang |
| 6,046,731 A | 4/2000 | Griffin et al. ................ 345/168 |
| 6,081,207 A | 6/2000 | Batio .......................... 341/20 |
| 6,190,068 B1 | 2/2001 | Chao .......................... 400/472 |
| 6,320,519 B1 | 11/2001 | Hsu et al. .................... 341/23 |
| 6,478,266 B1 * | 11/2002 | Tsau ....................... 248/118.1 |
| 6,641,316 B1 | 11/2003 | Goldstein et al. ........... 400/489 |
| 6,670,948 B2 | 12/2003 | Zarek |
| 6,883,984 B2 | 4/2005 | McLoone et al. ........... 400/486 |
| 6,984,081 B1 | 1/2006 | Goldstein et al. |
| 2001/0033763 A1 | 10/2001 | Goldstein et al. ........... 400/472 |
| 2005/0025549 A1 | 2/2005 | McLoone .................... 400/472 |
| 2005/0025550 A1 | 2/2005 | McLoone .................... 400/472 |
| 2005/0052832 A1 | 3/2005 | Monney et al. ............. 361/680 |
| 2005/0088414 A1 | 4/2005 | Adan et al. .................. 345/163 |
| 2005/0276651 A1 | 12/2005 | McLoone et al. ........... 400/489 |
| 2006/0043253 A1 * | 3/2006 | Huang et al. ................ 248/371 |

FOREIGN PATENT DOCUMENTS

| | | |
|---|---|---|
| JP | 07175562 A * | 7/1995 |
| WO | WO 9218926 A1 * | 10/1992 |
| WO | WO 9525334 A1 * | 9/1995 |

OTHER PUBLICATIONS

Kroemer, K., "Human Engineering the Keyboard," Human Factors, 14(1) 51-63, 1972.

Zipp et al., "Keyboard Design Through Physiological Strain Measurements," Applied Ergonomics, pp. 117-122, Jun. 1983.

Joyce Hedges, "Reinventing the Keyboard: Hunt 'n peck meets hi-tech," The Times, Monday, May 4, 1992, see C pp. 1-2.

"Kinesis® Maxim™ Adjustable Ergonomic Keyboard and Optional 10-key—User's Manual," Jun. 1997 Edition, pp. 1-21, Kinesis Corporation, Bothell, Washington.

Photographs of representative Kinesis® Maxim™ keyboard, Kinesis Corporation, Bothell, Washington, first sold at least as early as Jun. 1997 (3 pages).

* cited by examiner

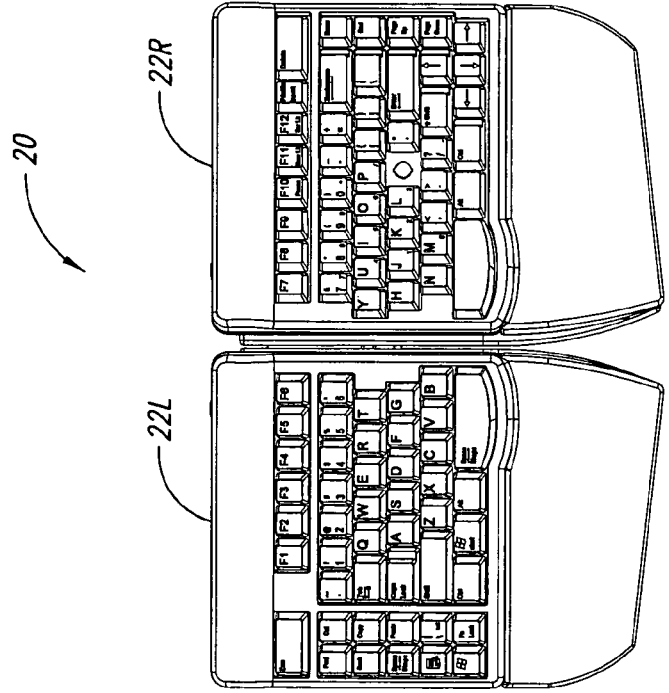
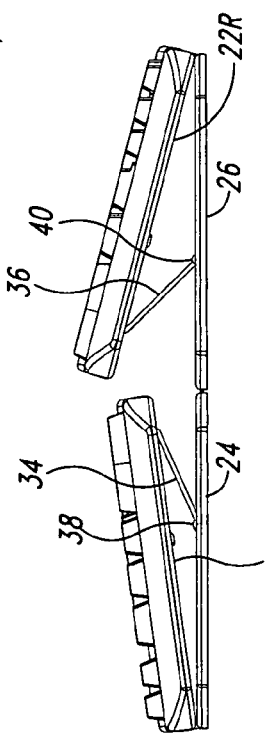
FIG. 7
FIG. 8

KEYBOARD WITH A PAIR OF PIVOTABLE KEYING MODULES

CROSS-REFERENCE TO RELATED APPLICATION

This application claims the benefit under 35 U.S.C. §119 (e) of U.S. Provisional Patent Application No. 60/647,546 filed Jan. 27, 2005, where this provisional application is incorporated herein by reference in its entirety.

BACKGROUND OF THE INVENTION

1. Field of the Invention

The field of the invention is that of ergonomic computer keyboards, specifically high-performance ergonomic keyboards intended to improve comfort and productivity compared to the conventional computer keyboard. Such high-performance computer keyboards are intended combine small size and easy-to-use features to improve comfort by minimizing the unnecessary strain, awkward postures, and excessive force associated with using the traditional computer keyboard, the latter having evolved more or less directly, without significant improvement, from a combination of the typewriter and the adding machine. Productivity benefits may be achieved by increasing the speed and/or accuracy of data entry or editing, or when stamina and work availability are increased. Appropriately-designed high-performance computer keyboards may also provide improved comfort and productivity when using pointing devices such as mice, trackballs, and touchpads (hereafter collectively termed "mouse or mice"), by facilitating improved posture and reduced reach, especially for right-handed mouse users.

2. Description of the Related Art

Origins of the Typewriter and Numeric Keypad

As is generally known in the field, the typewriter was invented in the late 1800s. What is less well known is that in the early 1900's, the rapid pace of industrial innovation led to credible attempts at improving the typewriter keyboard, including splitting it into right and left segments (e.g. McNamara, 1921 and Tyberg, 1926) and streamlining the layout of the keys (and Dvorak, 1936). However, in spite of the numerous improvements invented in this time period, the commercial typewriter became standardized on the less effective Sholes' design without substantial changes to its geometry or the organization of the keys.

The static design of the typewriter was probably due in part to the rapidly-established dependence of both workers and employers on standardized, and "portable" methods and equipment for written communications. Even though it was far from optimal by modern standards, the typewriter was a powerful productivity tool compared to writing longhand. It took substantial practice and skill to become proficient using a typewriter (in part because of its non-optimal design), and when proficiency was attained by students and job trainees, there were powerful social and economic forces resisting any changes that would have required retraining. Another phenomenon that retarded keyboard evolution in this period was the mechanical complexity of the devices. The equipment was limited by inflexible mechanical constraints.

The numeric keypad, which is an important part of the now-traditional computer keyboard, experienced an evolutionary path independent of the typewriter.

Perhaps because of the more diverse uses to which this type of device was subjected, or because it was simpler to learn and use a variety of configurations, or because some models were highly effective for specialized tasks, numeric keypads (adding machines) were produced in a variety of layout\s through the early 1900's. The invention of the compact 10-key adding machine dates to 1914 (patented by David Sunstrand). Much larger adding machines with far more keys (with columns of numbers dedicated to each decimal position) were in use even into the 1970's.

Computer Keyboards

The first computer terminal keyboards used the same typewriter-style arrangement of keys which had been adopted by earlier teletype machines, except for the addition of several new key actions which had not existed on the typewriter. Even with the invention of the personal computer, still more new key actions were simply added to the perimeter without changing the core typewriter-style layout. The first significant change to the keyboard occurred in 1983 with the introduction of a second-generation personal computer, the IBM XT, when the numeric keypad was added to the right side of the keyboard.

The second significant change to the keyboard was in 1986, coincident with the rapidly spreading usage of computers by the majority or office workers and the need for faster on-screen editing and navigation. New dedicated editing and navigational keys were added between the typewriter section and the numeric keypad section, making these new keyboards significantly wider still than their predecessors. This new version of the keyboard was called "enhanced" or "extended," and has become the de facto standard for virtually all computers. For the purposes of this discussion, this enhanced/extended keyboard design will be called the "traditional" computer keyboard.

Evolution of Computer Mousing

The computer mouse was invented by Douglas Englebart in 1968 and patented in 1970 (see U.S. Pat. No. 3,541,541). However, it wasn't until the introduction of the first APPLE® computer in the 1980's that the computer mouse became an important medium for interacting with computers. And it wasn't until the introduction by MICROSOFT® in THE 1990'S of the first WINDOWS®-based graphical user interface, after the evolution of the current "traditional" keyboard, that a majority of computer users began to be increasingly dependent on the mouse in their computer work.

Increasing dependence on the mouse created problems with the wide traditional computer keyboard. Since most people are right-handed, most computer users with wide traditional keyboards are forced to do extensive precision pointing and clicking while the right arm is extended beyond the right side of the keyboard. With the long-standard key spacing of 0.75 inch, the alphanumeric section of keys is approximately 11 inches wide, while the total width of a traditional computer keyboard is ~19 inches or more. Because all the non-alpha additions to the traditional typewriter keyboard are to the right side, the right side of the traditional keyboard is approximately 18 inches from the center of the alpha keys (effectively 36 inches in total width). Assuming a typical adult shoulder width of 16 to 20 inches, the average right-handed user (~80% of the population) would have to reach for the mouse approximately 8-9 inches further out than the ideal front-of-shoulder location.

Alternative Computer Keyboards

Alternative computer (electronic) keyboard designs began appearing in the patent and scientific literature as early as 1964, some long before the invention of the personal computer (IBM, 1964; Kroemer, 1972; Einbinder 1975; Malt and Hobday 1982; Zipp et al., 1983; McCall, 1983; Nakeseko et al, 1985; Lahr, 1987). Zip et al. in 1983 documented some of the features associated with ergonomic keyboards. For example, they documented that a semi-split keyboard (with a center-back, vertically-oriented pivot point) optimally should have a front-opening range up to approximately 30 degrees; and that tenting is optimal in the range of 10 to 20 degrees, while tenting beyond 20 degrees would cause detrimental effects for most users and tenting less than 10 degrees would not provide maximal relaxation of the forearm muscles.

McCall and Lahr described fully-split keyboards mounted on the edge of a desk or to the arms of a chair. Lahr also described a measurement feature for quantitatively determining the position and orientation of the keying modules.

The first known commercial alternative keyboard was the Maltron keyboard, a fixed-split design with semi-concave key arrays, and with isolated thumb-operated keypads near the midline of the keyboard which was produced and sold in the United Kingdom in the mid-1980s. The first known commercial letter-based alternative keyboard in the U.S. was the KINESIS® CONTOURED™ keyboard (similar to the Maltron), introduced in 1992. This was followed by the introduction of the Comfort keyboard (a fully-adjustable split keyboard mounted on a long desktop track) in late 1992 and the APPLE® semi-adjustable keyboard (two conventional keying modules linked by center-rear pivot point, with loosely-associated plastic palm rests), in early 1993.

Many of the published designs of the 1970's and 1980's (Kroemer, 1972; Einbinder, 1975; and Nakeseko et al., 1985) disclose partially-split keyboards with right and left halves rotated to a fixed orientation around a pivot point near the center rear of the keyboard. Sometimes the center of the keyboard was tented slightly.

Some keyboard designs commercialized in the 1990's recognized the importance of combining separation, tenting, and palm rests with a narrow, largely symmetrical shape so the mouse could be positioned more or less directly in front of the shoulder (e.g., the fixed-split CONTOURED™ keyboard from Kinesis Corporation, and fixed or adjustable semi-split keyboards from Cherry Electrical Products, Fujitsu-Siemens, and Acer).

The biggest problem with alternative keyboard designs has been achieving a balance of effectiveness (for both comfort and productivity), ease of use (setup and adjustment), familiarity (standard key layout), general appearance, adaptation (minimal or no learning curve), and cost. Historically, more-effective products have had more features and more exotic features and typically have required greater adaptation time. This, in turn, has reduced acceptance. For any two products with equivalent effectiveness, the one which is easier to set up and use with reproducible settings will be preferred as well.

The present invention creates for the first time a mainstream adjustable ergonomic keyboard family with highly effective features, each of which is best-in-class in both ease of use and performance. Adjustment mechanisms are easily produced to minimize cost. It requires virtually no adaptation and provides broad versatility. It should meet the needs of virtually anyone desiring significantly more comfort and productivity without an adaptation period, and should experience a high level of acceptability.

BRIEF SUMMARY OF THE INVENTION

The present invention is directed toward improved computer keyboards which effectively address the above three factors of comfort, productivity, and acceptability by balancing solutions to the problems of the traditional keyboard design. Many details of selected embodiments of the invention are described in the following text and illustrated in the corresponding drawings; however, one of ordinary skill in the art having reviewed this disclosure will appreciate that modifications can be made to the illustrated embodiments without deviating from the spirit of the invention. The inventor intends that all of these variations should fall within the scope of this disclosure.

In one embodiment, the invention is directed toward a computer keyboard having a base member, a keying module, and a spacing member. The base member has an upper portion, and it is configured to be supported by a structural member. The keying module has a lower portion configured to be positionable adjacent the upper portion of the base member, and it has an upper portion configured to operatively retain a plurality of keys thereon. The keying module is pivotably coupled to the base member such that at least a portion of the keying module is pivotable away from the base member. A spacing member is positioned between the base member and the keying module. A first edge of the spacing member is pivotally coupled to either the base member or the keying module and an opposing second edge of the spacing member is configured to abut the other of the base member and the keying module when the keying module is pivoted away from the base member. The spacing member is movable between a first orientation in which the keying module can be positioned adjacent the base member and at least a second orientation in which the keying module is spaced at an angle away from the base member. The other of the base member and the keying module has a plurality of engagement features adapted to releasably retain the spacing member at a corresponding plurality of angular orientations and to retain the keying module at a corresponding plurality of angles with respect to the base member.

In another embodiment, the invention is directed toward a computer keyboard having a pair of base members, a corresponding pair of keying modules, a linking member, and a pair of spacing members. Each base member has an upper portion and is configured to be supported by a structural member. A linking member is coupled between the pair of base members, and is slidable with respect to at least one of the base members such that the base members can be spaced laterally apart from each other. Each of the keying modules has a lower portion configured to be positionable adjacent the upper portion of the respective base member, and an upper portion configured to operatively retain a plurality of keys thereon. Each of the keying modules is also pivotably coupled to one of the base member such that at least a portion of each of the keying modules is pivotable away from one of the base members. One spacing member is positioned between each of the base members and the corresponding keying modules. A first edge of the spacing member is pivotally coupled to the base member and an opposing second edge of the spacing member is configured to abut the keying module when the keying module is pivoted away from the base member. The spacing members are independently movable between a first orientation in which the keying modules can be positioned adjacent the base members and a second orientation in which the keying modules are spaced at an angle away from the base member. Each of the keying modules has a plurality of engagement features adapted to releasably retain the respective spacing member at a corresponding plurality of angular orientations and to retain the keying module at a corresponding plurality of angles with respect to the base member.

The illustrated keyboard maintains a close-to-traditional key layout to minimize adaptation and maximize acceptance. Its narrow width minimizes reaching for the mouse and for editing keys, without reducing the standard key-to-key spacing or significantly reducing the size of those editing and modifier keys which are typically oversized.

One notable feature of the present invention is its ability to be rapidly and easily converted from a simple split keyboard to a fully adjustable split keyboard. The conversion mechanisms are remarkably simple and the adjustment mechanisms of the fully adjustable embodiments are remarkably simple to carry out. Thus the invention can meet the needs of a wide variety of computer users with a common intermediate product combined with selected field-installable accessories.

The net effect of this versatile family of configurations provides for ready acceptance due to minimal adaptation requirements and excellent comfort, as well as full productivity for the majority of computer users. In addition to geometric and mechanical features, novel and useful electronic features are incorporated which further enhance the value of the invention to the user. Specific novel aspects of the key layout are important in providing improved comfort and productivity in the present invention.

BRIEF DESCRIPTION OF THE SEVERAL VIEWS OF THE DRAWING(S)

FIG. 7 is a plan view of the split keyboard of FIG. 1, shown in a third configuration in which the sides are not spaced apart, and both side are tented.

FIG. 8 is a front elevation view of the keyboard of FIG. 7.

DETAILED DESCRIPTION OF THE INVENTION

Common Features

This application claims priority from U.S. Provisional patent application No. 60/647,546, filed Jan. 27, 2005. Applicant shows and describes in this application some of the embodiments disclosed in the provisional application; however, for purposes of clarity, some of the details in the provisional application have not been reiterated herein. As such, applicant incorporates herein by reference the provisional application in its entirety.

In general, the split adjustable computer keyboard of the present invention offers multiple configurations to meet different users' needs: it provides simple, reproducible, and sturdy adjustments without requiring complex mechanisms or forceful motions; and it provides integrated, padded, but easily removable palm rests that can be adjusted to the same attitudes as the keying modules.

The split keyboard of the present invention lends itself to a variety of embodiments for use in different applications; however, certain features are common to all embodiments. One particular embodiment is illustrated in the enclosed drawings to assist the reader in fully understanding many of the features that could be incorporated in an embodiment of this invention. The inventor appreciates, however, that embodiments of the invention can incorporate other features, and that features shown in the illustrated embodiment could be modified or removed without deviating from the spirit of the invention. On the contrary, the inventor considers all such modifications to fall within the scope of the present invention.

FIGS. 1-4 illustrate one particular embodiment of a split keyboard 20 according to the present invention, shown in a fully collapsed and compressed configuration. This particular configuration may be used, for example, for storage or transport, or by someone not seeking to take advantage of the keyboard's ergonomic benefits (e.g., when multiple persons share a single computer at different times). Also, if the linking plate (discussed below) were removed, a further configuration for storage or transport could be stacking the keying modules or folding the keyboard in half.

The split keyboard 20 includes a left keying module 22L and a right keying module 22R, positioned side-by-side. The keying modules 22L,22R combine to provide the keys generally associated with a computer keyboard, the keying module on the left carrying the keys typically actuated with the user's left hand and the keying module on the right carrying the keys typically actuated with the user's right hand. The particular keys and/or their respective locations can be modified without deviating from the spirit of the present invention.

Figure 10:
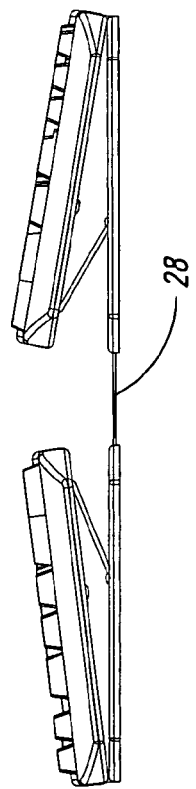
FIG. 10 is a front elevation view of the split keyboard of FIG. 9.

The keying modules 22L,22R are coupled together by a base assembly, which is comprised of a left base 24 and a right base 26 slidably connected to each other via a linking plate 28 (see, e.g., FIG. 10). The left and right bases 24, 26 are configured to be supported by a structure, such as a desk or table, as discussed elsewhere in this disclosure. The left and right bases 24,26 are connected to the respective keying modules 22 by means of hinges 30 (FIG. 4) along their lateral distal edges.

In the illustrated embodiment, palm rests 32 project proximally from each of the keying modules 22. It is appreciated that the split keyboard 20 can be designed with unitary palm rests or removable palm rests. Where removable palm rests are used, corresponding removable base-extension elements, which attach to the front (proximal to the user) of each base, can likewise be used.

Figure 1:
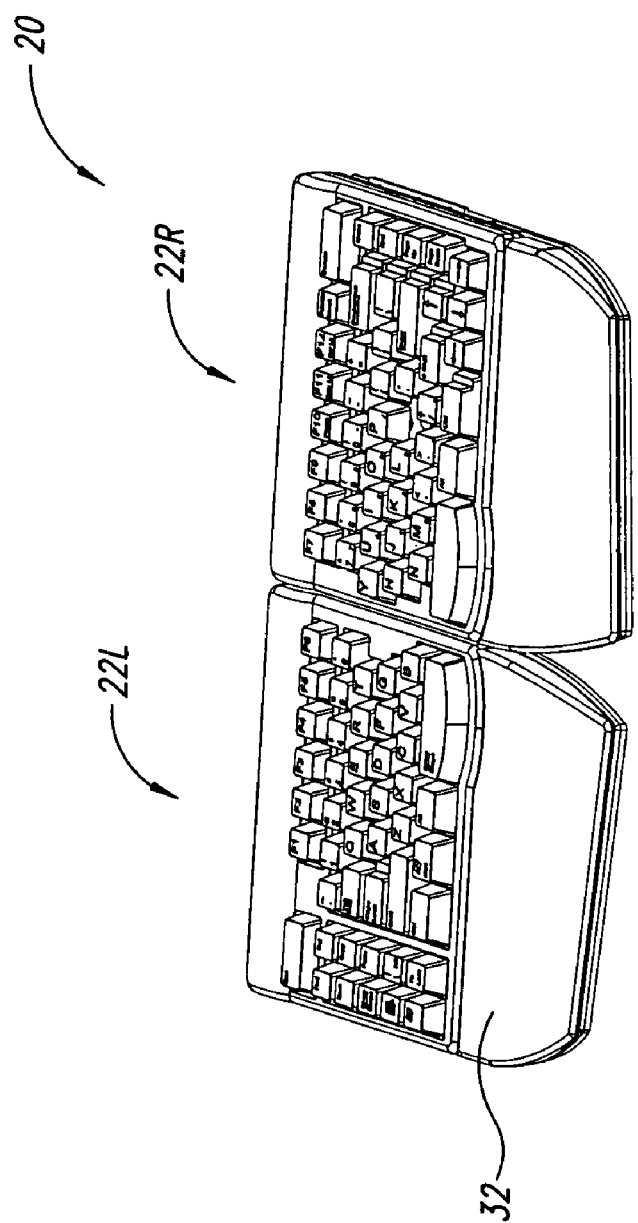
FIG. 1 is an isometric view of a split keyboard according to one embodiment of the present invention, shown in a first configuration in which the sides are neither spaced apart nor tented.
Figure 4:
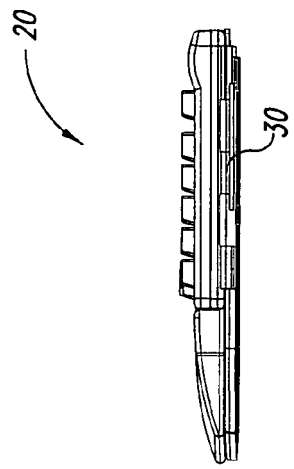
FIG. 4 is a right side elevation view of the split keyboard of FIG. 1.
Figure 2:
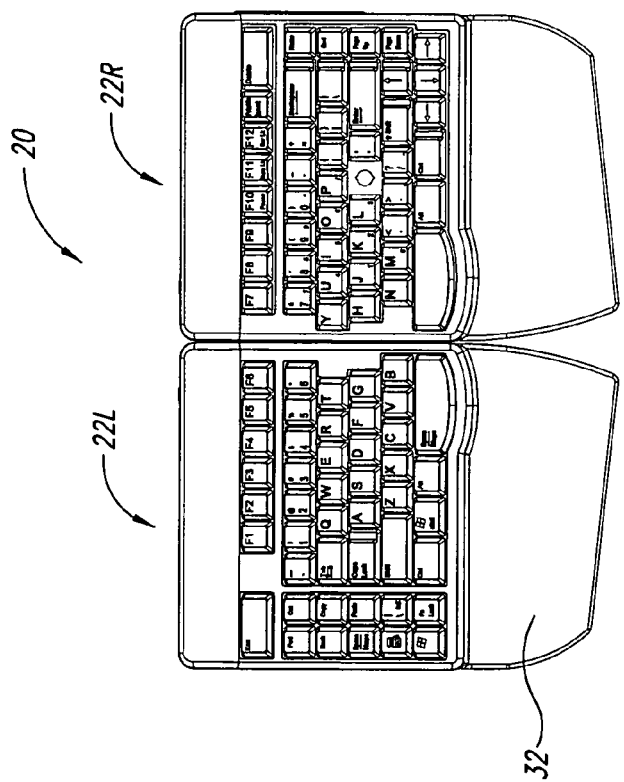
FIG. 2 is a plan view of the split keyboard of FIG. 1.
Figure 3:
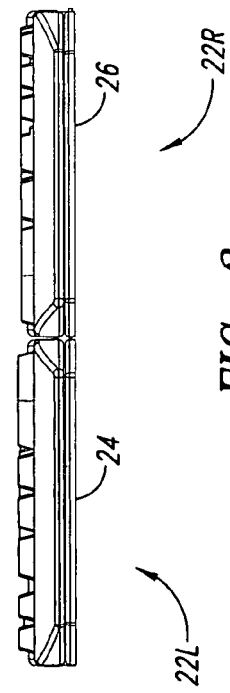
FIG. 3 is a front elevation view of the split keyboard of FIG. 1.
Figure 5:
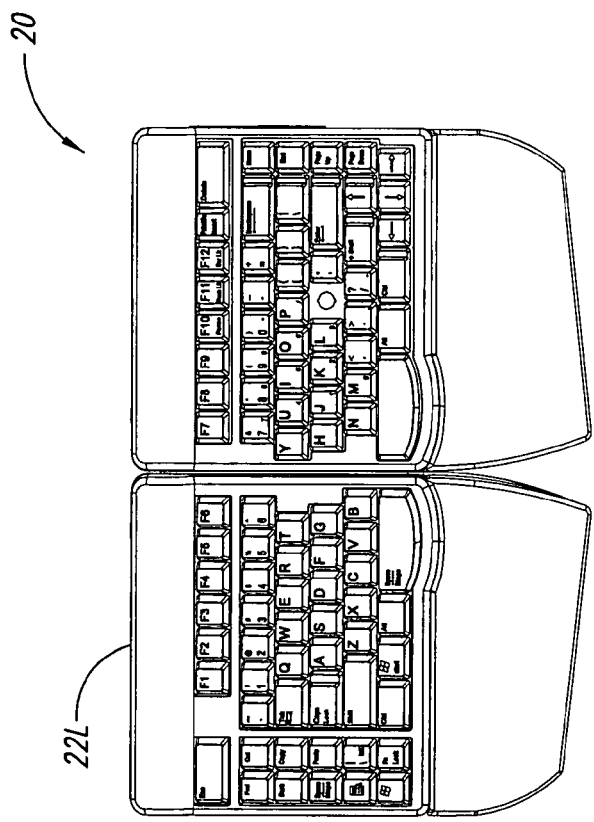
FIG. 5 is a plan view of the split keyboard of FIG. 1, shown in a second configuration in which the sides are not spaced apart, and one side is tented.
Figure 6:
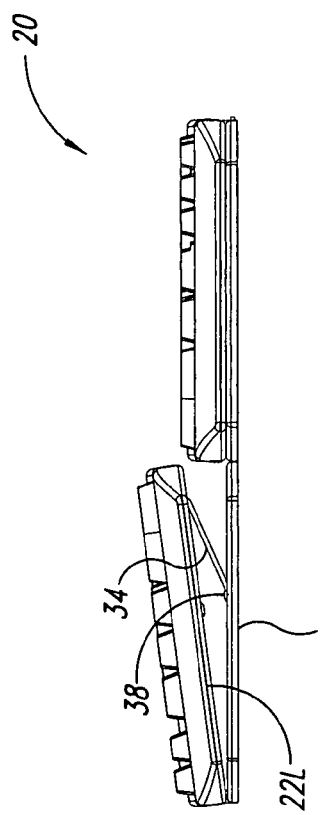
FIG. 6 is a front elevation view of the keyboard of FIG. 5.

FIGS. 5-8 illustrate the split keyboard 20 in two additional configurations. In FIGS. 5 and 6, only the left keying module 22L has been tented; in FIGS. 7 and 8, both the left keying module and the right keying modules 22R have been tented. As shown in FIG. 8, the left and right keying modules 22L, 22R can be tented independently, at either the same or different angles with respect to the respective bases 24,26.

A left lifting flange 34 is pivotably and reversibly attached to the left base 24 (and a left base-extension, if present), and a right lifting flange 36 is pivotally and reversibly attached to the right base 26 (and a right base-extension, if present).

In the illustrated embodiment, the left lifting flange 34 is attached to the left base 24 by a left flange hinge 38, and the right lifting flange 36 is attached to the right base 26 by a right flange hinge 40. An individual of ordinary skill in the art, having reviewed this disclosure, will appreciate that the flanges could be hingedly attached to the keying modules, or could be otherwise modified without deviating from the spirit of the present invention.

Figure 11A:
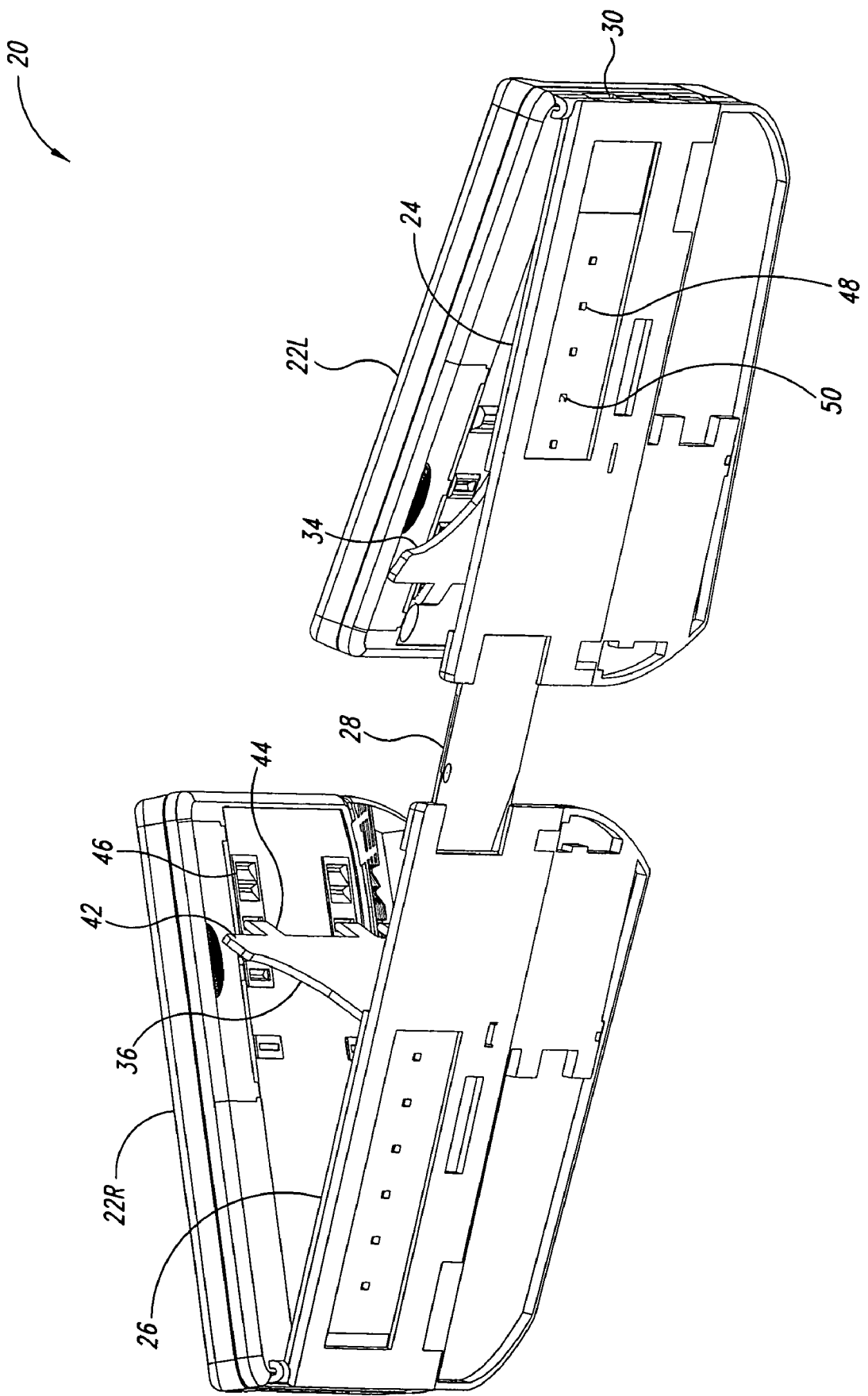
FIG. 11A is a bottom, rear isometric of the split keyboard of FIG. 9.

As best illustrated in FIG. 11A, each of the illustrated lifting flanges 34,36 is formed with a tab 42 and locking projections 44. To tent one of the keying modules 22L,22R, the user of the illustrated embodiment would lift the module while pulling upward on the tab 42 until the keying module is tented to the desired angle. Along the way, the locking projections 44 on the lifting flange 34,36 would sequentially contact the slots, each slot corresponding to a different tenting angle. When the user has tented the keying module to the desired angle, the user would merely release the keying module when the locking projections 44 have engaged the corresponding slots 46.

One novel feature of the illustrated embodiment is unexpected tenting range, sturdiness, and ease of positioning provided by the lifting flanges 34,36. The lifting flanges 34,36 allow tenting at discrete and reproducible settings, which is desired by both users and ergonomic professionals. Surprisingly, a single lifting flange 34,36 on each side can provide very sturdy support for many angles within the range of most desirable tenting angles. Even at the perceived extreme angles for the lifting flange, at the 10 and 30 degree tenting positions, the split keyboard 20 feels very sturdy. The lifting flange 34,36 does not perceptibly deflect even when fabricated from inexpensive means and materials, such as injection molding with ABS plastic with normal thickness.

In the illustrated embodiment, tenting angles range from approximately 10 degrees to approximately 30 degrees with intermediate positions (15, 20, and 25 degrees, where the untented, flat configuration is considered 0 degrees), all using one support flange 34,36 for each keying module 22L,22R. An individual of ordinary skill in the art will appreciate that, with the addition of special, fixed-angle lifting flanges, the tenting angle could be extended to significantly greater angles, including vertical (90 degrees) if desired; though it is anticipated that the preferred configuration for most users will fall in the tenting range of 10 to 30 degrees, and most especially in the range of 10-20 degrees. While it is anticipated that most users will configure each side symmetrically, the user may easily create asymmetrical configurations.

Equally surprising is the ease with which the lifting flanges 34,36 and keying modules 22L,22R can be positioned at different tenting angles. The user (from the normal operating position) can reach to the back (distal edge) of the split keyboard 20 and simply lifts one or both lifting flanges 34,36 (e.g., using, for example, either the first or second finger of the hand) for the corresponding tab 42 which can extend slightly beyond the back edge of each keying module 22L,22R. When the first tenting position is reached, the locking projections 44 fall into it's the corresponding slots 46 with an easily discernable click, at which time the tab 42 can be released. If a greater tenting angle is desired, the tabs 42 may be lifted further until the desired slot 46 is reached. To lower the keying module 22L,22R, the keying module may be raised slightly (typically with other fingers) while either gravity or a gentle push from the first or second finger lowers the lifting flange 34,36. This process requires neither force nor skill, which increases the likelihood that users will use the desirable tenting feature of the split keyboard 20. The prior art has never approached this combination of tenting range, sturdiness, and ease of use.

Linking Plate

Figure 13:
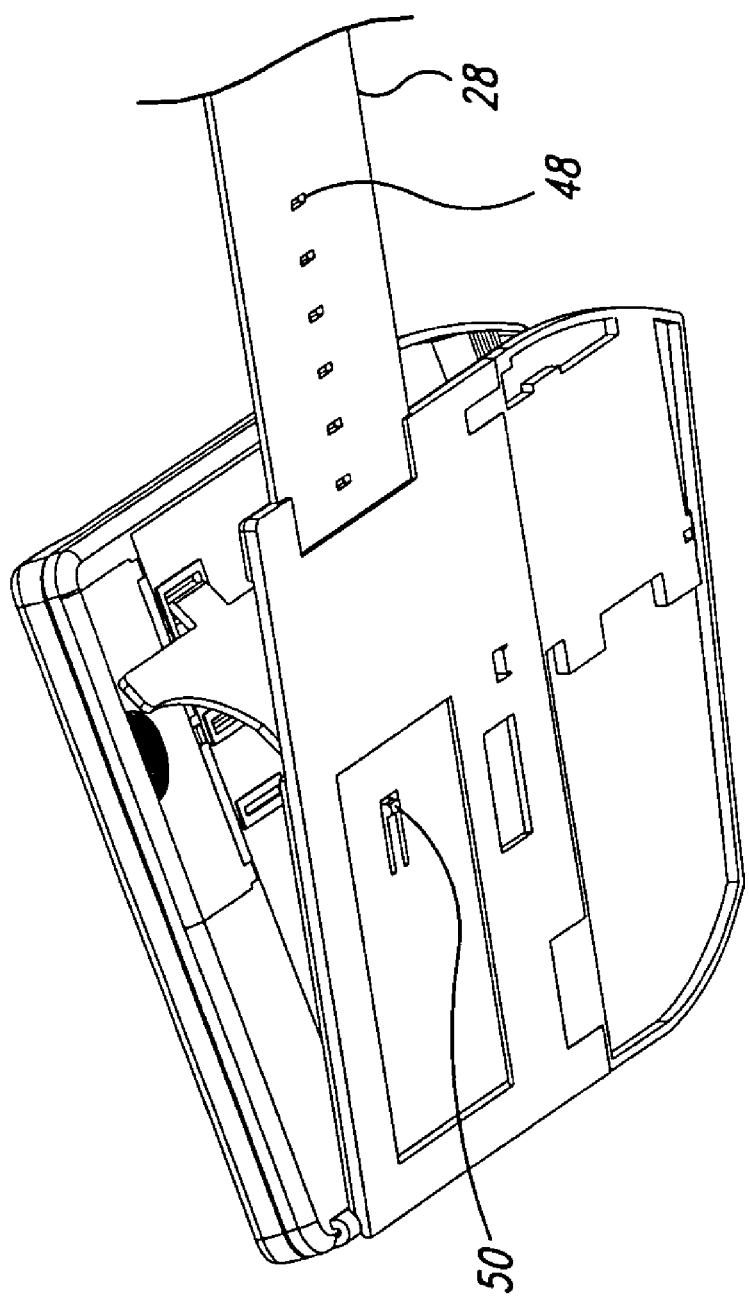
FIG. 13 is a bottom, rear isometric of the split keyboard of FIG. 1, shown in a fifth configuration in which the sides are spaced apart from each other by a second distance, and both side are tented.

As illustrated in FIGS. 9-12, fully adjustable split keyboards 20 may be linked together by a linking plate 28. The linking plate 28 can be fabricated from a rigid but resilient material such as steel, aluminum, or rigid plastic such as glass-filled nylon, or from other suitable materials. The linking plate 28 allows adjustable positioning of the base elements 24,26 (and thus the keying modules 22L,22R) in either or both separation distance and rotational orientation. In the illustrated embodiment, the linking plate 28 is slidable with respect to each of the keying modules 22L,22R, allowing different separation distances to be achieved by the user. In the illustrated embodiment, discrete reproducible distance settings can be achieved by appropriately-positioned orifices 48 in the linking plate 28, which align to engage a self-hinged or spring-loaded latching button 50 (best illustrated in FIG. 13), which at least partially penetrates the orifice when the two are aligned, providing resistance to further movement.

The force required to change the separation distance can be adjusted by the relative size and shape of the orifice 48 and the latching button 50. A final, maximum stopping position can be absolute, by use of one or more mechanical features such as a pin or screw, or relative, by providing progressively greater but not insurmountable resistance. This latter aspect can be accomplished, for example, by providing small orifices 48 which allow only partial penetration by the latching button 50 for the intermediate position stops, and a larger orifice for the terminal position stops, where the latching button penetrates the orifice more deeply and thus creates greater resistance to movement. An individual of ordinary skill in the art, having reviewed this disclosure, will appreciate this and the other means for carrying out such features. In any case, the linking plate 28 may be completely removable in the event that the user desires to rotate the keying modules 22L,22R relative to each other, or to separate the modules more than allowed by the linking plate.

In one particular embodiment, the linking plate 28 slides evenly from both sides when the keying modules 22L,22R are gently pulled apart. This can be accomplished, among other ways, by gradually changing the properties of the orifices 48 in the linking plate 28 from the center towards each end. For example, slightly increasing the size of the orifices 48 (detention slot) from the center to the distal opening will require slightly greater force to move to the next position as the keyboard modules 22L,22R are pulled apart, as the latching button penetrates the larger orifices more fully. In some applications, the user may prefer the ability to move only one keying module 22L,22R to the next stop in order to achieve intermediate separation of the modules. This would be possible by, among other ways, holding the linking plate 28 with one hand and pulling on the selected key module 22L,22R with the other hand. The orifices 48 can be produced as a molded component which inserts into the linking plate 28, —thus providing greater precision, longer life, replaceability, but retaining the strength and low cost of steel for the main body of the linking plate. Alternatively, the latching button 50 could be produced as a component to be snapped into the linking plate 28 and the orifices 48 could be molded into the bottom of the base 24,26. An individual of ordinary skill in the art, having reviewed this disclosure, will appreciate these and other variations that can be made to these features without deviating from the spirit of the invention.

Figure 9:
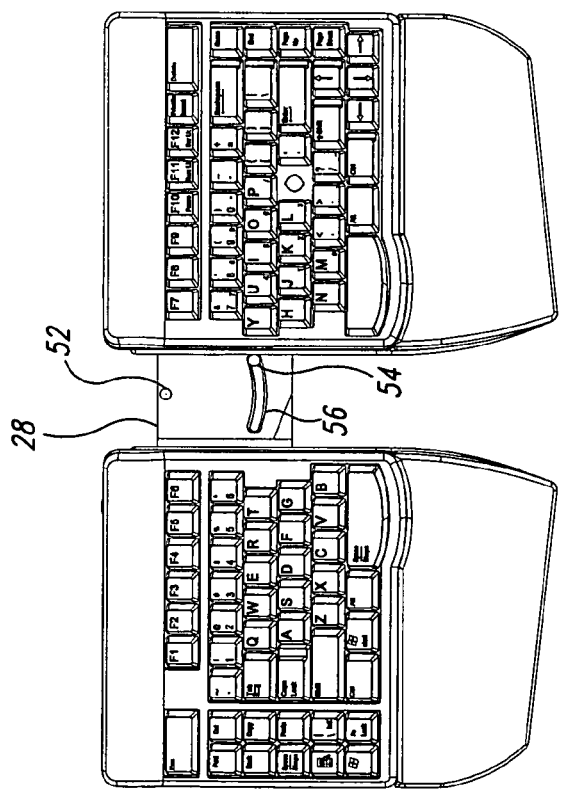
FIG. 9 is a plan view of the split keyboard of FIG. 1, shown in a fourth configuration in which the sides are spaced apart from each other by a first distance, and both side are tented.

In selected embodiments, the linking plate 28 can be pivotable. For example, as shown in FIG. 9, the linking plate 28 can be formed from two pieces hinged together. In such an embodiment, a pin 52 can pivotably connect two sides of the linking plate 28 and a slider 54 fixed to one side of the linking plate can track along an arcuate slot 56 in the other side of the plate. The length and orientation of the arcuate slot 56 can dictate the range of motion of the linking plate 28. Such a pivotable linking plate allows the keying modules to be rotated while still maintained in a defined and reproducible relationship to each other.

Convertibility of Simple and Fully-Adjustable Split Keyboards

Figure 11B:
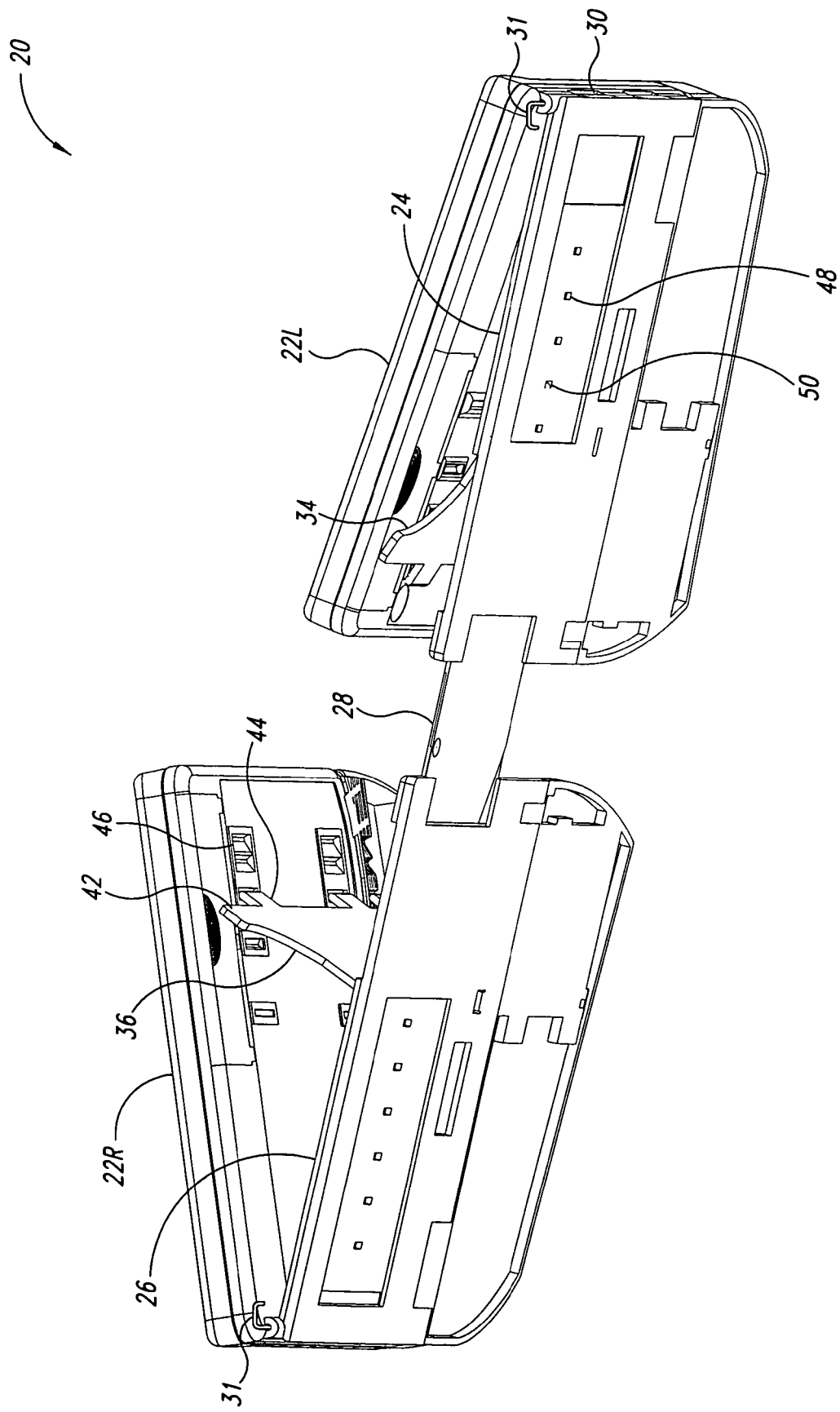
FIG. 11B is a bottom, rear isometric of a split keyboard according to an alternate embodiment of the present invention.
Figure 12:
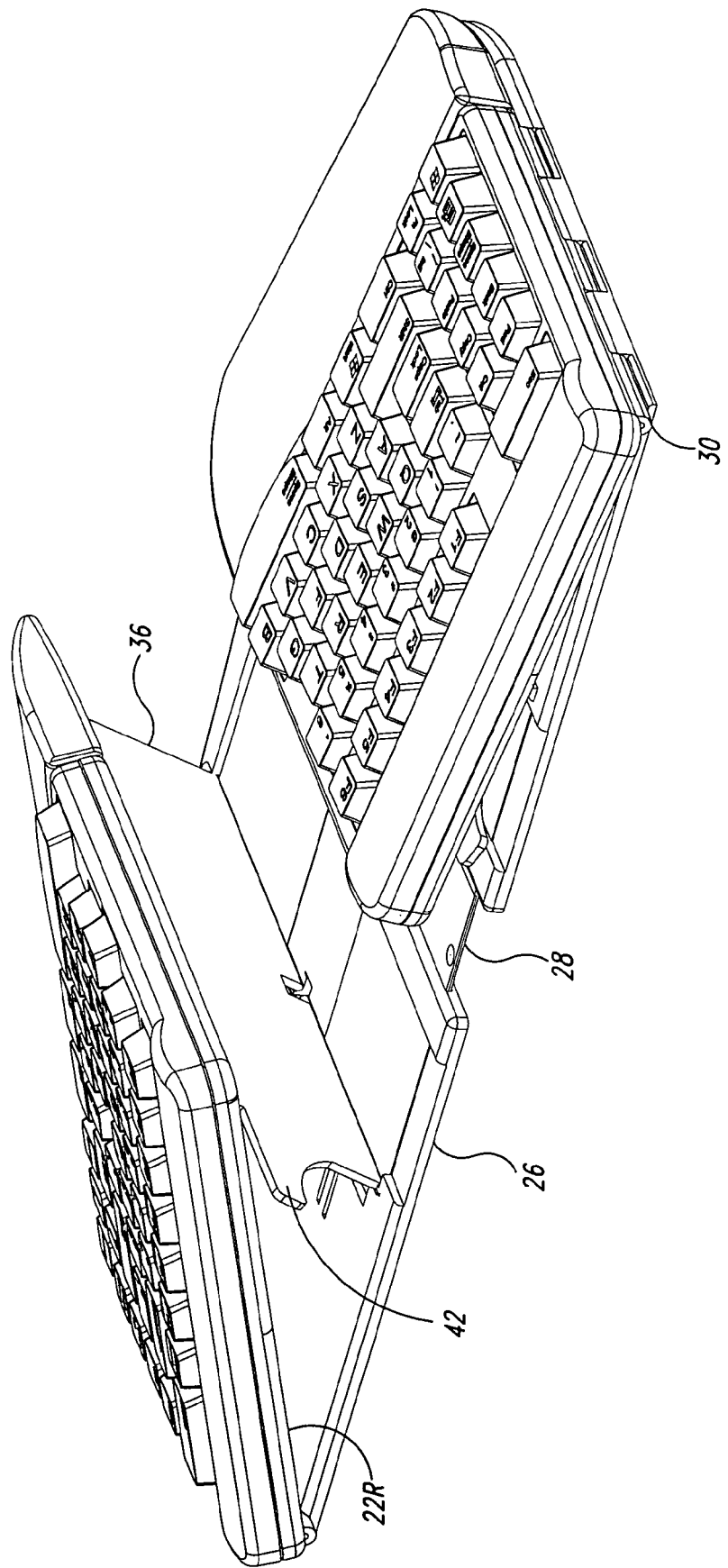
FIG. 12 is a top, rear isometric of the split keyboard of FIG. 9.

A key feature of the particular embodiment of the present invention illustrated in FIG. 11B is that the keying modules 22L,22R readily attach via hinges to the respective base units 24,26, using hinges that incorporate removable hinge pins 31 with an enlarged, easily-handled gripping features on one end. This construction allow for easy conversion back and forth between simple versions of the split keyboard 20 (in which the keying modules 22L,22R do not tent) and fully-adjustable versions of the split keyboard 20 (such as that shown in FIGS. 11A and 11B). One particular embodiment of the removable hinge pin 31 has a crimped, looped end, which is inexpensive to fabricate and is easy to grip.

To convert the simple split keyboard 20 to a fully-adjustable model, the keying module 22L,22R is oriented on the base with the two hinge 30 elements interdigitated. The removable hinge pin 31 is inserted into one end. After it is fully inserted, the gripping loop can be folded down to lock in place in a recess or other feature on underside of case. The first portion of the removable hinge pin 31 could anchor tightly at the end of travel if the channel in which it is inserted had a smaller diameter at the distal end. To convert the fully-adjustable model to the simple model, the gripping loop is lifted and the removable hinge pin 31 is removed.

Removable Palm Rests

Also surprising is that removable palm rests, when present, are supported with no additional action by the user. Previous designs with removable palm rests (Siemens KBPCE and Kinesis Maxim) required a separate and awkward adjustment step for the palm rests whenever a tenting angle was changed. In embodiments of the present invention, however, a longer lifting flange 36 is used when palm rests 32 are installed. However, even with a shorter lifting flange 34 designed for configurations where the palm rests 32 are removed but with palm rests and base extensions installed, acceptable sturdiness is achieved as long as the user does not support more than the normal weight of hands and arms on the palm rests. In fully-adjustable models, the lifting flanges 34,36 that support the keying modules 22L,22R also support the palm rests 32 without requiring any special adjustment.

A removable base extension is typically provided with fully adjustable embodiments for use when palm rests are installed. When the palm rests 32 are used with the fully adjustable embodiment, an extended lifting flange 36 and base extension are provided to create a stable platform for supporting the palm rests.

Since lifting flanges 34,36 are typically different lengths depending on whether palm rests 32 are installed, it can reduce manufacturing and packaging costs if a single lifting flange can be converted from long to short. For this purpose, the flanges may be scored or otherwise adapted to facilitate shortening by bending and breaking off one end. In one embodiment, the lifting flange 36 incorporates a feature which allows a long version to be regenerated by clipping the end piece back onto the short lifter. This is feasible since the weight of the keying modules 22L,22R would not stress this clip joint, being applied to the hinged portion of the lifter.

Electrical Connections to Left and Right Keying Modules

When the center of the split keyboard 20 is lifted ("tented"), the keying modules 22L,22R will elevate from their hinges 30 and the medial edge of each module will move away from the centerline. In some embodiments, a flexible electrical connection extends between the two keying modules 22L,22R. One such wired design which is also extensible is shown in FIG. 8A of the Provisional Application. Such a design was prototyped to provide a 5 inch separation between left and right keying modules (see Provisional Application, FIGS. 9A-D) and the cable extended and retracted easily.

An alternative to an extensible and retractable linking cable is an exposed linking cable (Provisional Application, FIG. 10). In some embodiments it is desirable for the linking cable to be detachable by the user, to facilitate transport, storage, or repair. In another embodiment, each module could be equipped with its own separate keyboard electronic module, which could be linked via cable (e.g. USB) or wireless means to the computer. FIGS. 8A-B and 10 in the Provisional Application depict possible arrangements of circuit boards, connectors, and other electronic components. Any of these embodiments could incorporate a wireless connection using available technology used for other keyboards.

If a wired connection is used, the simplest electronic design can utilize a 14-to-16 wire cable to link the left matrix to the right matrix, without requiring any active electronic components. Such a cable could be detachable and replaceable using easy-to-operate connectors such as those used with PCMCIA devices (modems, network cards, e.g. Honda brand). However, for embodiments which add additional special key actions to the left side (see, e.g., Provisional Application, FIG. 1B), additional wires will be required in any linking cable. The Goldtouch keyboard uses approximately 25 wires in a linking cable and the present invention could do so as well. If a small diameter wire (e.g. 30 gauge) is used to reduce the outer diameter of the linking cable, which would be desirable if more than approximately 16 wires are required, detachability of the linking cable is a further benefit in case replacement is required due to a broken wire inside.

Wireless Split Keyboards

Wireless keyboards are well known in the art, for applications where the user does not wish to be tethered to the computer by a cable. In the present invention, because the split keying modules are smaller than a unified keyboard, and the electronics supporting wireless communication are typically somewhat more bulky than those communicating via a cable, and because on-board batteries are required, the main electronics module and the batteries are typically stored in different modules. For embodiments wherein the two keying modules are connected by a linking cable, said cable will require at least two additional wires (power and ground) to connect the batteries to the electronics.

However, one wireless embodiment of the invention can also eliminate the linking cable, by utilizing separate wireless control modules and battery compartments in each keying module. In such a fully-wireless embodiment, because both modules must be active at all times, this feature is not normally feasible due to latency as the computer recognizes and activates each module in turn. However, an unexpected capability of one commercial product, the Adesso 2.4 Ghz wireless keyboard and touchpad, has been demonstrated. In this example, two standard commercial units can communicate simultaneously with a single USB receiving unit. These keyboards have integrated wireless touchpads and remarkably, both keyboards and touchpads can communicate virtually simultaneously (with normal typing speeds on both keying modules) through a single receiving unit. While batteries would be required in each module, the linking cable typically weighs the same or more than the normal batteries, so that such a totally wireless embodiment may be lighter as well as more compact and more convenient to use than the embodiment which uses a linking cable.

Chair-Mounted Split Keyboards

Previous patents have described ergonomic keyboards attached in various ways to a chair. While not necessary for effective use, wireless embodiments of the present invention may be preferred for certain chair-mounted applications. The fully-wireless embodiment described above offers significant advantages in that the linking cable does not need to be routed behind and or under the seat back or pan. However, the wireless keyboard with linking cable offers an unexpected benefit, in that additional battery capacity may be stored under the seat pan and connected to the keyboard electronics via the linking cable.

In order to provide low-cost and flexible positioning, a split ergonomic keyboard has required two sets of attachment hardware that has proven expensive, difficult to adjust, and/or has lacked sturdiness. The versatile configurability of the present invention provides significant benefits for embodiments in which the split keyboard is mounted to a chair or to an under-desk track. To provide the important stability and resistance to rocking or bouncing which is important with a chair/track-mounted keyboard, the keyboard attachment arms can be fabricated as a hollow extrusion or clamshell assembly of injection molded plastic, or from hemmed or flanged steel 14 gauge or greater.

Chair-mounted embodiments of the present invention can be configured generally in three different ways which vary in their adjustability, and likewise in their cost and sophistication. A horizontally-adjustable embodiment utilizes the simple configuration (described above). The attachment arm is connected to underside of each keying module. Depending on the type of arm, attachment hardware may use a sliding, clip-on or bolt attachment mechanism to the chair (typically via the arms). If the chair arms have not been specially adapted, a specialized bracket designed to connect to the keyboard attachment arm may be installed on the chair (typically between the arm rest and arm pad). When the keyboard attachment arm is designed to slide on or clip to the chair, an easily-removable bolt (typically a thumbscrew) can be used to prevent accidental or inadvertent detachment of the keyboard attachment arm. In order to facilitate making a sturdy connection of the keying module to that attachment arm, an attachment may be utilized to facilitate a strong connection, the bottom of the keying model may be specially designed with screw bosses or one or more integrated bolts Significant horizontal adjustability can be achieved even with the simple split keyboard attached to a chair if the attachment arms are slotted, and are attached to the keying module with a means to easily loosen and tighten the attachment, such as a knob and bolt. When the knob is loosened by the user, the keyboard may be rotated and/or slid proximally or distally relative to the user, in the horizontal plane. With a rotating arm rest provided on many office chairs, even greater adjustability may be achieved. If a palm rest is present, the attachment arm may be designed to support said palm rest.

A fully-adjustable embodiment of the invention utilizes the adjustable version of the keyboard (described above). The keying modules may be mounted to the arms of a chair using an attachment arm similar or identical to that described above and providing the same range of horizontal adjustability. However, since the adjustable version of the keyboard incorporates the ability to provide tenting, significantly greater adjustability is provided. This embodiment offers the unexpected benefit of providing easy access to the undersides of keying modules in order to change batteries without requiring that the keyboard be detached from the chair.

A maximally-adjustable embodiment may use a ball joint near the chair arm to which the attachment arm is connected. By temporarily loosening the ball joint, a user may tilt the keyboard modules in any direction. Either the simple or the adjustable version of the keyboard may be used to achieve full adjustability. An additional benefit over the highly-adjustable embodiment described above is that the keying modules can be positioned very close to the user's legs, since no base module is present upon which the keying modules are supported.

Track-Mounted Split Keyboards

Such embodiments as described for mounting split keyboards to a chair also may be employed for mounting to an underdesk track or arm. This may be accomplished using the same or similar hardware as described above for mounting to the arms of a chair.

Pointer Tray for Chair and Track-Mounted Keyboards

When keyboards are attached to chair arms or to an underdesk arm, a surface must be provided for using a pointing device (e.g. mouse, touchpad, or related device) unless a pointing device such as a touchpad or pointing stick (IBM trackpad) is integrated into one or both keying modules. Embodiments of the present invention employ a small, thin tray (hereafter termed "mouse tray"), typically 4×6 inches but ranging from approximately 3×5 to 5×7 inches, which includes its own attachment arm that can be clipped on or slide into either side of each keying module.

If it is desirable that the pointer surface maintain the same attitude as the keying module, the ball-joint version of attaching the keying modules to the chair arms may be used.

Special Electronic Features for Wireless Versions

A unique electronic feature applicable to wireless versions is the transient LED feature. Wireless keyboards previously have not supported LEDs in the keyboard for reporting the status of Numlock, Scroll Lock, Capslock, or Fn status because they would excessively drain the batteries required for operation of the keyboard: Traditionally wireless keyboards provided such LEDs on the receiver module attached to the computer. However, the advent of very small receiver "dongles," long range wireless transmitters such as 2.4 Ghz and higher frequencies capable of transmitting 30 feet or more, and large screen monitors and televisions that might serve as distance monitors, have all combined to eliminate the status LEDs in wireless devices. However, the user still benefits from knowing the status of these LEDs for maximum productivity.

The present invention solves this dilemma by providing user selectable, transient activation of status LEDs. This can be accomplished by providing a dedicated "LED" key (for example near the LEDs), which activates the LEDs when pressed but deactivates them when released. Alternatively, a key may be used for this purpose in combination with the Fn key to reduce the possibility of accidental activation.

One of the major shortcomings of wireless devices is that they can behave poorly because of signal interference, or because of weak batteries. It can be very frustrating for users when problems arise and it is not easy to determine the cause. A novel use of the above-described transient LED feature is its use as a battery charge status indicator. This feature would not require any power when not in use, because it would be activated only when the LED key is pressed in combination with another key (e.g. Fn). If a battery charge (e.g. battery voltage) monitoring circuit is included in the electronics, its status may be transiently reported by illuminating one or more of the LEDs. For example, if 4 LEDs are present, all 4 would illuminate if the typical fresh-battery voltage of 1.59 is sensed. 3 LEDs might illuminate if the voltage is 1.4-1.5, and 2 LEDs might illuminate is the voltage had dropped to 1.3.

Key Layouts

A further important feature is the highly effective key layout, which retains familiarity (an important element is accomplishing acceptability), while reducing reaches and adding special editing keys to further enhance productivity. Without changing the well-known alphanumeric key layout, editing keys can be optimized so that they are easier to reach yet hard to touch accidentally. While the relative positions and functions of the peripheral keys may change depending on the operating system and the needs of typical software application, the basic principles include symmetrical right and left side, and a single vertical column of editing keys on the far right.

Figure 14:
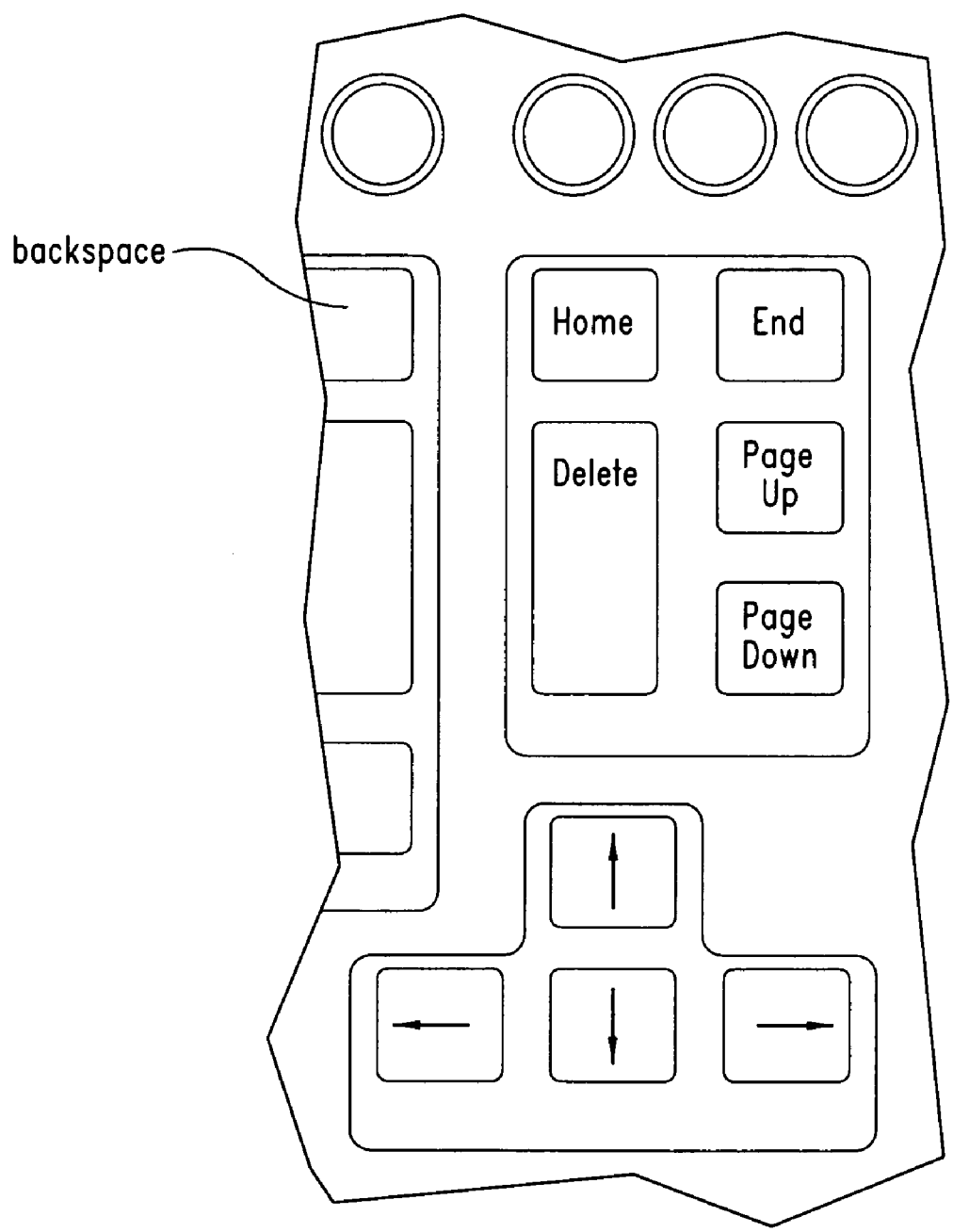
FIG. 14 is a plan view of a portion of a keyboard according to the prior art.
Figure 15:
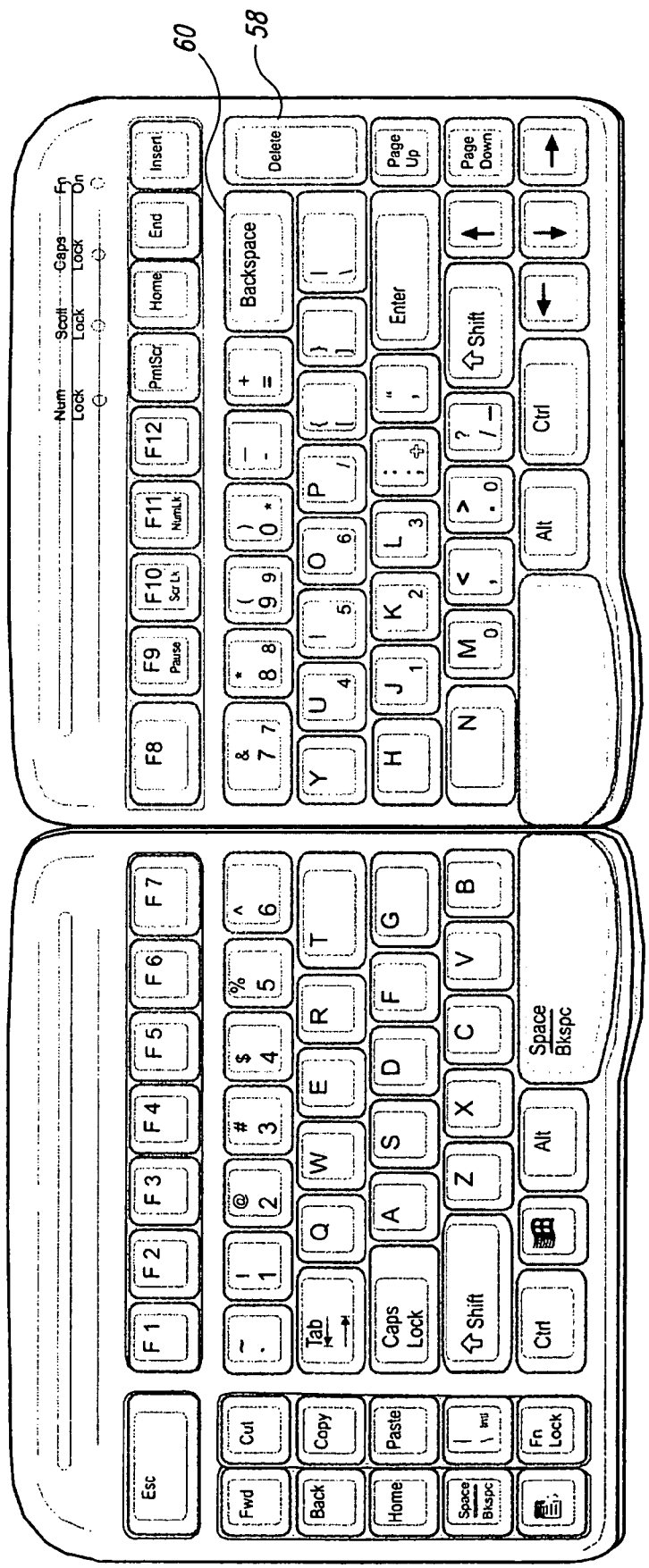
FIG. 15 is a plan view of a split keyboard according to yet another embodiment of the present invention.

As illustrated in FIG. 15, embodiments of the present invention also can provide an over-sized, horizontal or vertical Delete key 58 adjacent to the Backspace key 60. This arrangement is novel and highly effective, since the Delete key 58 and the Backspace key 60 are often used frequently during editing and are related to each other in their actions. (As depicted in FIG. 14, known prior art keyboards have a double-tall vertical Delete key, but it is not adjacent to backspace.) The prior art Insert key is located to the side of the horizontal Delete key or above (distal from) the vertical Delete key, or as an embedded action, thus isolating it from the other editing keys. Hitting the Insert key by accident can cause inadvertent over-typing and many computer users employ this key action less than the other editing and modifier keys. This layout of the six editing keys preserves the general left-to-right and top-to-bottom arrangement of editing keys with which computer users are familiar.

In order to accommodate the optimal positioning of heavily used editing keys and still provide full-size function keys for accurate and convenient typing, several seldom used actions can be embedded (that is, accessible only when an Fn key is used to activate a hidden layer). The right side can include top level F7-F12 plus PrintScreen and the oversize Delete key. Embedded actions can include seldom-used Insert, Scroll Lock, Num Lock, and Pause/Break.

Elongated Space Bars and Expanded Central Gap

Figure 16:
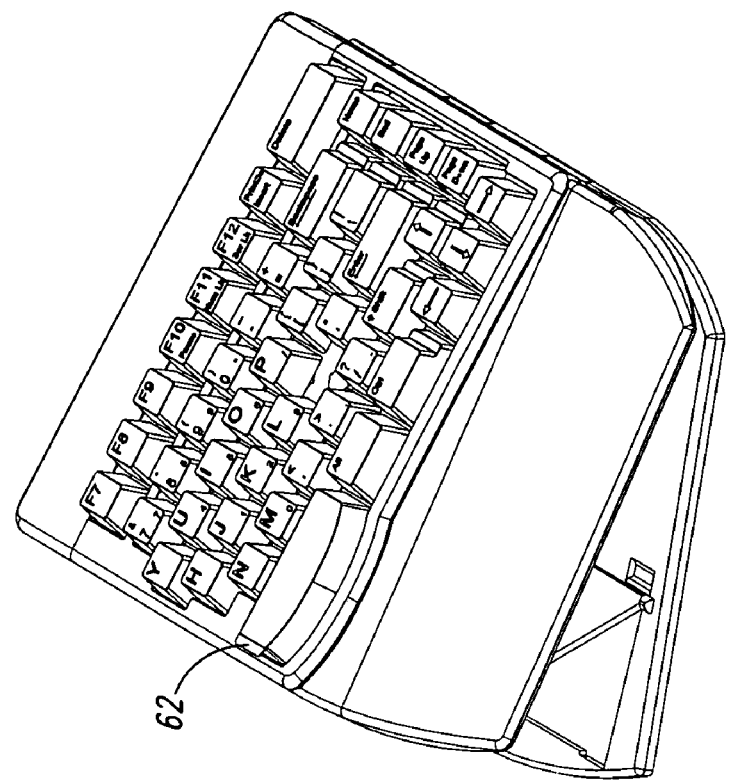
FIG. 16 is an isometric view of a split keyboard according to yet another embodiment of the present invention.
Figure 16:
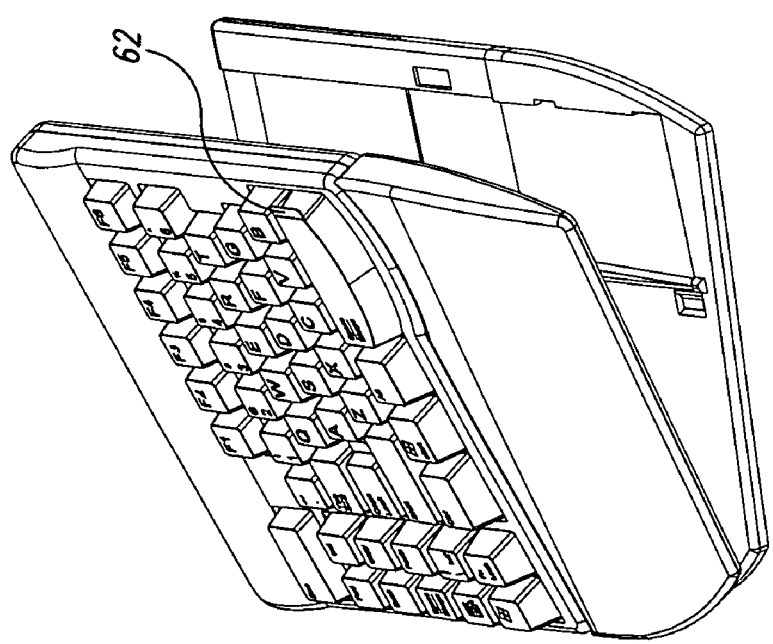

A shortcoming of known prior split keyboards is that for some users, the Space Bars do not extend far enough towards the midline. As shown in FIG. 16, a novel way to provide an optional extended space bar is to extend a thin flange 62 medially from the normal edge of the space bar. (Notably, FIG. 16 also shows an embodiment of the split keyboard that does not incorporate a liking plate.)

In some embodiments (e.g. Provisional Application, FIGS. 1D, 2B, 2C, 2D), the medial edge or edges of the keying modules can be extended by the flange 62 to extend the Space Bar by an additional 0.2-0.4 inches (typically 0.3 inches), to meet the needs of these special users. Because most users type the Space bar mostly with the right thumb, such an extension is most important for the right Space bar. However, to maintain symmetry and to support the needs of left handed typists, many embodiments utilizing the extended Space Bar make both of them the same size and shape. This can also maintain a lower cost, and cost is an element that affects acceptability.

Such embodiments can provide additional benefits to the user because they increase the inherent gap between left and right keying modules, which in turn increases the straightness of the wrists even if a front opening angle is not selected, and reduces the magnitude of any front opening angle (and thus reduces the adaptation period) if a front opening angle is selected. However, the additional gap in the middle may be judged to negatively affect acceptability, so it is not included in all embodiments.

Familiar Editing Keys

An important factor in achieving acceptability and productivity with narrow and symmetrical keying modules is the unique arrangement of editing keys. These keys must appear familiar and conveniently placed for a user accustomed to either the traditional or "Natural-style" keyboard, and yet the arrangement must allow the narrowest possible design.

It is difficult to design a keyboard which is simultaneously narrow, with adjustable and nearly-symmetrical modules, and with fully accessible editing keys which are not positioned where they can be easily struck inadvertently. The sacrifice in size, placement, and isolation of editing keys is the typical major failing of previous keyboards which were designed to be only 14-16 inches wide and yet used the normal key spacing. However, the present invention accomplishes the objective of narrowness without sacrificing acceptability, accuracy, or productivity by applying the well-known "stepped keycap" in a novel way. In addition to the Capslock key on the left keying module, which is often stepped, many the keys on the right side of the right keying module, just to the left of the far edge editing keys are stepped. These normally include Backspace, Pipes/backslash, Enter, R-Shift, and R-Control.

For the embodiment of the right keying module which has full-size arrow keys which occupy the same row as the space bar, and full-size function keys arrayed at the top, the optimal step width is achieved by optimizing the widths of the Shift, Enter, Ctrl keys. If the step is excessively wide, the Shift key becomes excessively narrow. If the Shift key is excessively wide, the step becomes excessively narrow. An optimal step provides good tactile feedback to the user without requiring an unnecessarily long reach for the editing keys.

The Shift key in the preferred embodiment is substantially shorter than the Shift key of a typical traditional keyboard; however, it is substantially larger than the shift key of many so-called "small footprint" keyboards, which use a small shift key with no isolation from neighboring editing and modifier keys. The present invention also provides a larger tactile surface for the Shift key than some known ergonomic keyboards.

The effect of such down-stepping of the keycap is to physically isolate the right-most column of editing keys so that they are not accidentally depressed, but to visually maintain the traditional large size of the keys which are stepped. This feature is important for both productivity (accuracy) and for acceptability of the design. The actual widths of the raised and down-stepped portions of the former keys may be varied somewhat depending on the desired tradeoffs between narrowness, performance, and acceptance; but in general the stepped keycap should provide the largest possible contact surface without having so little stepped surface that the effective isolation of the key to the right is reduced.

An important feature of the novel application of keytop stepping is that by stepping a group of neighboring keys by the same amount, a smaller step distance can be effective which allows for the desirably larger contact surface of the keytops. It will be recognized that the exact width and depth of the stepping can be varied for different keyboard designs without losing the inherent benefit of physically isolating the key to the right of each stepped key. In the present invention, the width of the stepped down region should be at least 0.12-0.15 inches wider than the normal border of a non-stepped keycap, and most desirably 0.15-0.20 inches of horizontal stepped surface.

As noted in FIG. 11, the Goldtouch keyboard uses three equal stepped keys (Capslock, Right Cntrl, and Right Shift) but this design greatly reduces the contact surface of the Right Shift key compared to the traditional or Natural-style keyboard. Whereas a Natural-style keyboard has a right shift key with a contact surface 1.5 inches wide, the same surface on a Goldtouch keyboard is only 0.65 inches wide (a 57% reduction in contact surface). By contrast, embodiments of the present invention provide a Right Shift contact surface of at least 0.83 inches wide.

Special Editing Keys on the Left Side

Furthermore, because the left side of the keyboard is inherently narrower than the right side, the inclusion of at least three and up to 12 special editing keys (see Provisional Application, FIG. 1B), which are not normally present on a traditional keyboard, will increases productivity and maintains acceptability without increasing the overall width of the keyboard.

To achieve maximal acceptance, it is important that special software drivers are not required for the keyboard, even when it includes such special editing keys. Therefore embodiments of the present invention will provide keys which produce standard key codes recognized by the intended operating system, which codes are well know to one experienced in the art.

A unique feature which will provide a further productivity enhancement will allow the user to convert the left Space Bar to perform Backspace. This configuration can be activated by pressing a combination of the Fn plus the small, left side key legended similar to "Spce/Bkspc." User acceptability will be maintained because the default setting will be the Space Bar action.

Embedded Key Actions

It is common in laptop computer design to "embed" certain key actions which are not commonly used. Such embedded keys may be accessed by pressing a special function key, often labeled "Fn" of "Fcn."

Multi Modal (Tap and Hold) Fn Key

The "En" key on a keyboard with multiple layers of key actions is either a "shift" or "toggle" action. In the present invention, the Fn key can be multimodal, performing selectively in both ways.

Said Fn key may perform either as a "Shift" key (active only while pressed) or a toggle key (shown as Fn lock, requiring a tap to activate and another tap to inactivate). Embodiments of the present invention also use this approach to embed both the numeric keypad and well as the seldom-used Scroll lock, Pause/break, and Insert functions. While Insert is used more often than the latter two embedded function key actions, Insert is often hit by mistake when placed in an more accessible location, which results in significant typing errors as previously entered data may be erased by the introduction of new data. In most configurations, a toggle Fn key is preferred, however in embodiments where additional left side keys are present, both shift and toggle versions of the Fn key may be provided.

The column of editing keys on the right keying module can retain a very familiar arrangement, even though the keys are in a vertical column rather than a horizontal group of six keys as used in the Traditional and Natural-style keyboards. For languages which read from left to right, as in all those of the Americas, Europe, and much of the remainder of the world, reading the traditional "group of six" editing keys from left to right results in the same sequence as reading those editing keys of the present invention from top to bottom. This location of said editing keys can increase productivity and acceptance of the present invention, because they are located on the right side of the keyboard as with traditional keyboards, and because many laptop computers also use a vertical column including at least some of these editing keys in order to reduce the width of their keyboards.

Notwithstanding the discussion above, variations may be made in the actions and/or positioning of certain keys on the far left of the keyboard without significantly affecting the benefits of familiarity and efficiency of the design.

All of the above U.S. patents, U.S. patent application publications, U.S. Patent applications, foreign patents, foreign patent applications and non-patent publications referred to in this specification and/or listed in the Application Data Sheet, are incorporated herein by reference, in their entirety.

From the foregoing it will be appreciated that, although specific embodiments of the invention have been described herein for purposes of illustration, various modifications may be made without deviating from the spirit and scope of the invention. Accordingly, the invention is not limited except as by the appended claims.

The invention claimed is:

1. A computer keyboard comprising:
two keyboard assemblies, each including a base member having an upper portion and being configured to be supported by a structure, each keyboard assembly further including:
a keying module having a lower portion configured to be positionable adjacent the upper portion of the base member, and an upper portion configured to operatively retain a plurality of keys thereon, each keying module extending with respect to the user between proximal and distal ends, and between inner and outer lateral edges, and being pivotably coupled to the base member toward the outer lateral edge such that the inner lateral edge of the keying module is pivotable away from the base member; and
a single unitary and rigid lifting flange positioned between the base member and the keying module, a first edge of the lifting flange being pivotably coupled to a central portion of the base member, the lifting flange directly accessible by a user to be pivoted about a pivot axis, an opposing second edge of the lifting flange having at least one protrusion, the keying module having at least three slots arranged in a series, the protrusion and each slot being sized and shaped such that the protrusion releasably engages the slot, the protrusion wedging against the slot in response to a weight of the keying module to securely retain the lifting flange in a raised orientation in which the inner lateral edge of the keying module is spaced at an angle away from the base member, lifting the keying module releasing the protrusion from the slot, each slot being positioned with respect to the pivot axis such that the lifting flange rigidly supports the keying module at a corresponding distinct angle when the protrusion is inserted in the respective slots, the corresponding distinct angle of the keying module while the protrusion is in a first slot being at least 5 degrees different from the corresponding distinct angle of the keying module while the protrusion is in each of a second slot and a third slot.

2. The computer keyboard of claim 1 wherein the plurality of slots are positioned to allow the corresponding keying module to be releasably retained at least at angles measuring 10 degrees, 20 degrees and 30 degrees from a plane of the base member.

3. The computer keyboard of claim 1 wherein the outer lateral edge of each keying module is pivotably coupled at a hinge to a corresponding outer lateral edge of the base member.

4. The computer keyboard of claim 1 wherein the outer lateral edge of each keying module is pivotably coupled at a hinge to a corresponding outer lateral edge of the base member, the hinge having a pin selectively removably secured in the hinge, allowing the keying module to be removed from the base and used separate from the base member or hingedly attached to another base or support structure.

5. The computer keyboard of claim 1 wherein each lifting flange comprises a tab toward the second edge thereof, the tab extending at an angle with respect to the protrusion to be accessible by a user, the tab being adapted to be manipulated by the user to facilitate moving the corresponding lifting flange between the plurality of slots and achieve a desired orientation of the corresponding keying module at a desired angle.

6. The computer keyboard of claim 1, further comprising a palm rest selectively removably coupled to the proximal end of each keying module without requiring a tool.

7. The computer keyboard of claim 6 wherein each lifting flange is adapted to support the palm rest as part of the corresponding keying module, the respective palm rests configured to resist deflection when the protrusion of the corresponding lifting flange is in the raised orientation and the corresponding palm rest is spaced from the base member.

8. A computer keyboard comprising:
a pair of base members, each base member having an upper portion and being configured to be supported by a structure;
a linking member coupled between the pair of base members, the linking member slidably coupled to at least one of the base members such that the base members can be spaced laterally apart from each other, the linking member being bifurcated at a hinge member configured to allow the linking member to be articulated in a plane parallel to the base members, such that the base members can be oriented at an angle to each other;
a pair of keying modules, each keying module having a lower portion configured to be positionable adjacent the upper portion of the respective base member, and an upper portion configured to operatively retain a plurality of keys thereon, each of the keying modules being pivotably coupled to one of the base members such that at least a portion of each of the keying modules is pivotable away from one of the base members; and
a pair of spacing members, one spacing member being positioned between each of the base members and the corresponding keying module, a first edge of each of the spacing members being pivotally coupled to a central portion of a respective one of the base members and an opposing second edge of each of the spacing members being configured to abut the corresponding keying module when the keying module is pivoted away from the base member, each spacing member being independently movable between a first orientation in which the keying module can be positioned adjacent the corresponding base member and a second orientation in which the keying module is spaced at an angle away from the corresponding base member, the keying modules each having at least three engagement features adapted to releasably retain the respective spacing member at least three corresponding angular orientations and to retain the keying module at least three corresponding angles with respect to the base member, each of the at least three corresponding angles of the keying module being at least 5 degrees different from each other.

9. The computer keyboard of claim 8 wherein the linking member and at least one of the base members are configured to releasably engage at selected distances to facilitate separation by a user to a desired width.

10. The computer keyboard of claim 8 wherein at least one of the linking member and the base members has a protuberance thereon and the other has a plurality of spaced apart depressions therein adapted to mate with the protuberance to facilitate the projection of the linking member from the base member to a desired distance.

11. The computer keyboard of claim 8 wherein the linking member engages each of the two base members at a medial edge, and wherein an opposing lateral edge of each of the keying modules is hingedly coupled to the respective base member.

12. The computer keyboard of claim 8 wherein the linking member is removably coupled to the base members such that the base members and keying modules can be separated from each other.

* * * * *